United States Patent Office 3,067,209
Patented Dec. 4, 1962

3,067,209
9-(OMEGA-AMINOALKYL)-XANTHENOLS AND 9-(OMEGA-AMINOALKYLIDENE)-XANTHENES
Karl Doebel, Gerald Rey-Bellet, Reinhard Schläpfer and Hans Spiegelberg, all of Basel, Switzerland, assignors to Hoffmann-La Roche Inc., Nutley, N.J., a corporation of New Jersey
No Drawing. Filed June 6, 1957, Ser. No. 663,881
Claims priority, application Switzerland June 12, 1956
11 Claims. (Cl. 260—335)

This invention relates to novel chemical compounds and to novel intermediates and novel processes useful in producing the same. More particularly, it relates to compounds which can be broadly characterized as being derived from xanthene or thioxanthene and which carry a basically substituted side chain attached to the 9-position thereof; and to intermediates and processes for making said substituted xanthenes and thioxanthenes.

In the following disclosure, the numbering system used for xanthene derivatives is that indicated under System No. 2000 in "The Ring Index" by Patterson and Capell (New York, 1940), i.e.

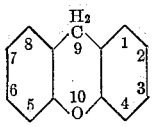

For the sake of uniformity, the numbering system used herein for derivatives of thioxanthene is the alternate numbering system shown under "Ring Index" System No. 2019, i.e.

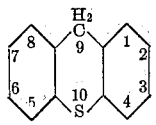

From a broad product point of view, the invention provides novel compounds selected from the group consisting of: bases constituted by 9-xanthenols and 9-thioxanthenols each of which carries a basically substituted non-aromatic radical in the 9-position, and their respective nuclear alkyl-, aralkyl-, aryl-, alkoxy-, aralkyloxy-, aryloxy-, alkylthio-, aralkylthio-, arylthio-, halo-, acyl-, amino-, hydroxyl- and carboxyl-substitution products; bases constituted by dehydration products of the foregoing and stereoisomeric forms thereof; and acid addition salts and quaternary salts of all of the foregoing bases. The basically substituted non-aromatic radical is preferably a lower alkyl radical substituted by a tertiary amino group, e.g. a di-(lower alkyl)amino(lower alkyl) radical. The N,N-lower alkyl radicals can be joined in a five- or six-membered ring, if desired with an additional oxygen or sulfur atom, e.g. as in the radicals ω-(N-piperidino)-propyl, ω-(N-morpholino)-propyl, ω-(N-thiamorpholino)-pentyl and the like.

The process provided by the present invention comprises condensing a compound selected from the group consisting of xanthones and thioxanthones each of which may carry one or more nuclear alkyl-, aralkyl-, aryl-, alkoxy-, aralkyloxy-, aryloxy-, alkylthio-, aralkylthio-, arylthio-, halo-, protected acyl-, protected amino-, protected hydroxyl- and/or protected carboxyl substituents with a compound having the formula

A—B wherein A represents a metal-organic group containing more than two carbon atoms and B represents a monovalent tertiary amino radical, hydrolyzing the metallo condensation product obtained, splitting off any protecting group which may be present and, if desired, subjecting the 9-substituted xanthene-9-ol or thioxanthene-9-ol thus obtained to dehydration. By "protected amino substituent" is meant e.g. the reaction product of the amino group with one mole of Grignard reactant. For the purpose of protecting the hydroxyl substituent, this group may be transformed e.g. into a tetrahydropyranyl-ether group. The keto group of the acyl substituent may be protected e.g. by ketalisation with glycol.

The preparation of the heterocyclic starting materials required for the practice of the invention can be effected according to procedures known per se. Thus, the thioxanthones can be prepared, for example, by condensation of thiosalicylic acid or appropriately substituted thiosalicylic acids with benzene or appropriately substituted benzenes. Alternatively, the thioxanthones can be prepared by condensation of diazo-anthranilic acid or appropriately substituted anthranilic acids with thiophenol or appropriately substituted thiophenols and subsequent cyclisation. The preparation of some new compounds of this class is more elaborately described in the examples. The xanthones can be similarly prepared, for example, by condensation of orthochlorobenzoic acid or appropriately substituted orthochlorobenzoic acids with alkali metal phenolates or appropriately substituted alkali metal phenolates. The preparation of the non-aromatic metal-organic compounds containing one or more basic substituents can likewise be prepared by methods known per se. In a preferred mode of execution, magnesium compounds of dialkylaminoalkyl halides are employed as the basically substituted non-aromatic metal organic compounds, and these can be prepared, for example, by direct reaction of magnesium with an ethereal solution of a dialkylaminoalkyl halide. In such case, an especially active form of metal is employed, e.g. a finely divided copper-magnesium alloy such as that of Gilman (Recueil des Travaux Chimiques des Pays-Bas, 47 [1928], 19), and the reaction is initiated by addition of a suitable alkyl halide, e.g. methyl iodide, ethyl bromide and the like.

In the first stage, referred to above, of a process according to the invention, magnesium-, lithium- and zinc organometal compounds can be employed. In a preferred procedure, the xanthones or thioxanthones are employed either in solid, finely divided form, or in solution in an inert organic solvent such as absolute ether, benzene, tetrahydrofuran and the like. To this heterocyclic reactant is added a solution in an inert organic solvent of the magnesium compound of a dialkylaminoalkyl halide. When the reaction is completed, the metal-containing condensation product is hydrolyzed. It is especially advantageous to effect the decomposition of the metal-containing condensation product in neutral or slightly alkaline medium, e.g. by hydrolysis in aqueous ammonium chloride solution. In this manner, the basically substituted -thioxanthene or -xanthene compounds are obtained in the form of the free base, and can be separated from the byproducts of the reaction and isolated by treatment with suitable organic water immiscible solvents, e.g. ether, ethyl acetate, chloroform, methylene chloride and the like.

The second stage of the general process, referred to above, comprises splitting out water from the 9-basically substituted-9-xanthenol or -9-thioxanthenol by treatment with reagents ordinarily employed for such purposes, e.g. sulfuric acid, iodine in benzene, potassium bisulfate, zinc chloride and the like. In the case of the 9-basically substituted-9-thioxanthenols, this dehydration step is preferably effected by treatment with phosphorus oxychloride, preferably by heating at the reflux temperature. In the case of the 9-basically substituted -9-xanthenols, the dehydration is preferably effected by treatment with a hydrogen halide, preferably in solution in an inert organic solvent and at room temperature.

When applied to asymmetrically substituted starting materials, the process of the present invention leads to stereoisomeric mixtures of 9-xanthenes and 9-thioxanthenes. The particular isomers may be isolated by known processes, i.e. by fractional crystallization.

In one of its comprehensive aspects, the invention provides a process which comprises condensing a compound having the formula (I) 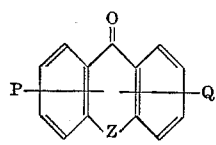

wherein Z represents a divalent chalkogen selected from the group consisting of oxygen and sulfur, P represents a monovalent radical selected from the group consisting of hydrogen, halogen, lower alkyl and lower alkoxy and Q represents a monovalent radical selected from the group consisting of hydrogen, halogen, lower alkyl and lower alkoxy attached to anyone of carbon atoms 1–8, by means of a metal-organic reaction with a basically substituted lower alkyl halide having the formula (II) 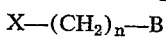

wherein X represents a halogen, $n$ represents an integer from 3 to 7, inclusive, and B represents a monovalent tertiary amino radical, and hydrolyzing the metallo condensation product obtained, thereby producing an intermediate compound having the formula (III) 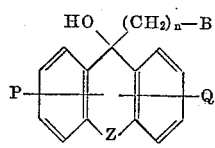

wherein each of the symbols Z, P, Q, B and $n$ has the same meaning set forth above; and, if desired, dehydrating said intermediate compound thereby producing a compound having the formula (IV) 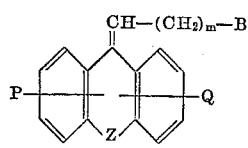

wherein each of the symbols Z, P, Q and B has the same meaning set forth above, and $m$ is a number equal to $n$ minus one, i.e. a whole number from 2 to 6, inclusive. This comprehensive process of the invention can be illustrated by the following flow sheet, wherein each of the symbols Z, P, Q, B, $n$ and $m$ has the meaning set forth above, and the symbol M represents a monovalent metallo radical useful in facilitating metal-organic condensations, e.g. a lithium or magnesium halide or zinc salide rest.

FLOW SHEET

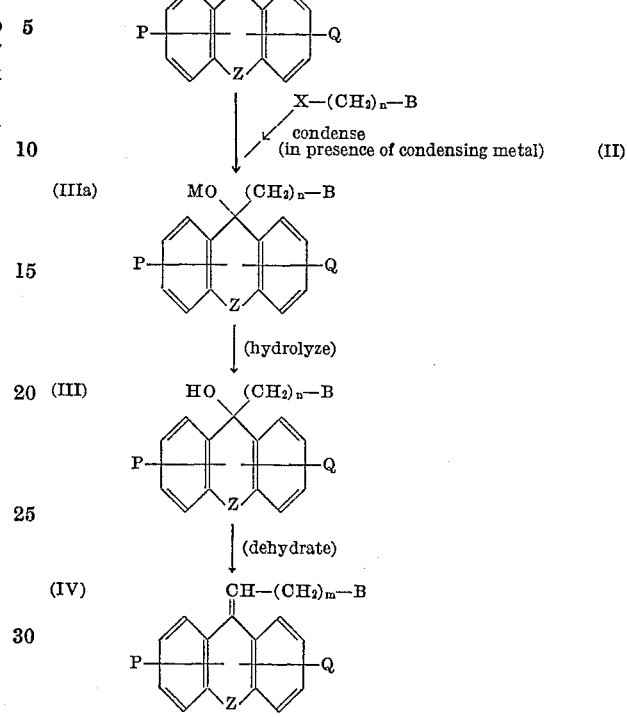

Preferred novel compounds of the invention are those selected from the group consistingn of: bases constituted by 9-ω-di(lower alkyl)amino-propylidene-thioxanathene, 9-ω-di(lower alkyl)-amino-propylidene-xanthene, 9-ω-di-(lower alkyl)aminopropyl-thioxanthen-9-ol, 9-ω-di(lower alkyl)amino-propyl-xanthen-9-ol, and their respective nuclear (especially in 2-position) halo-, lower alkyl- and lower alkoxy-substitution products; acid addition salts of said bases with pharmacologically acceptable acids; and quaternary salts of said bases with pharmacologically acceptable quaternizing agents. Exemplary of pharmacologically acceptable acids that are suitable for the practice of the invention are common mineral acids such as hydrochloric acid, hydrobromic acid, phosphoric acid, sulfuric acid and the like, and common organic acids such as acetic acid, tartaric acid, maleic acid, citric acid, ethanesulfonic acid and the like. Exemplary of pharmacologically acceptable quaternizing agents that are suitable for the practice of the invention are common quaternizing agents such as methyl bromide, ethyl bromide, ethyl iodide, dimethyl sulfate, ethyl paratoluenesulfonate and the like.

The novel products of the invention (as exemplified, for instance, by the products of Formula III and of Formula IV shown above) exhibit manifold pharmacologic activity, especially upon the nervous system. These compounds are accordingly useful as medicinals, and particularly they are useful as adrenolytic, sedative, antihistaminic, antipyretic, hypothermic and narcotic-potentiating agents.

The invention is further disclosed in the following examples, which are illustrative but not limitative thereof. Temperatures are stated in degrees centigrade, uncorrected.

*Example 1*

In a 1-liter, 3-neck flask fitted with stirrer, dropping funnel and condenser were placed 2.5 g. of activated finely divided copper-magnesium alloy (Gilmann, op. cit. supra). This was covered with 10 cc. of dry ether and 0.5 cc. of methyl iodide were added. As soon as the vigorous reaction subsided somewhat, 7.5 g. of magnesium shavings were added in a single portion, and a solution of 40 g. of freshly distilled ω-dimethyl-aminopropyl chloride in 180 cc. of dry ether was dropped in during a period of one hour. The reaction mixture was then boiled for five hours at 40° under a reflux condenser, and then was stirred overnight at room temperature. On the following day, a suspension of 20 g. of finely pulverized xanthone in 400 cc. of dry ether was added portionwise while continuing the stirring. The whole mixture was then stirred for an additional period of 20 hours at 20°–25°. Thereupon the reaction mixture was cooled with ice water and mixed with a cold saturated ammonium chloride solution. The organic layer was separated, the aqueous layer was extracted twice, each time with 100 cc. of ether, and the combined ethereal portions were dried over sodium sulfate and evaporated. The residue, upon recrystallization from high boiling petroleum ether, yielded colorless crystals of 9-(ω-dimethylaminopropyl)-xanthen-9-ol; M.P. 109°–110°.

25 g. of 9-(ω-dimethylaminopropyl)-xanthen-9-ol, were dissolved in 250 cc. of absolute ethanol, and the solution was mixed with 25 cc. of ethanolic hydrogen chloride solution (30% HCl by weight). The reaction mixture was allowed to stand for three hours at room temperature, then the alcohol was removed under diminished pressure at 30°–40°, and the residue was recrystalilzed from ethanol-ether. The product thus obtained, 9-(ω-dimethylamino - propylidene) - xanthene hydrochloride, formed colorless, water-soluble crystals; M.P. 201°–202°. The free base is an oil.

6.0 g. of 9-(ω-dimethylaminopropylidene)-xanthene hydrochloride were dissolved in 50 cc. of water and treated with an excess of sodium hydroxide solution. The oily 9-(ω-dimethylaminopropylidene)-xanthene which separated was extracted with methylene chloride, the methylene chloride solution was dried over sodium sulfate and evaporated. The residue was dissolved in 40 cc. of dry acetone and the solution was saturated with methyl bromide at room temperature. Thereby, the bromomethylate of 9-(ω-dimethylaminopropylidene)-xanthene precipitated immediately and, upon recrystallization from alcohol-ether, melted at 215–216°.

Example 2

In a 1-liter, round bottom flask fitted with stirrer, dropping funnel and condenser, 2.5 g. of activated finely divided Gilman copper-magnesium alloy were covered with 20 cc. of dry ether and 0.5 cc. of methyl iodide was added. As soon as the vigorous reaction subsided somewhat, there was added 7.5 g. of magnesium shavings in a single portion, and a solution of 40 g. of freshly distilled ω-dimethylaminopropyl chloride in 180 cc. of dry ether was dropped in during a period of 1 hour. The reaction mixture was boiled for five hours at 40° under a reflux condenser and then stirred overnight at room temperature. On the following day a suspension of 23.5 g. of finely pulverized 2-chloro-xanthone in 400 cc. of dry ether was added portionwise while stirring. The whole mixture was then stirred for an additional 20 hours at 20–25°. The reaction mixture was cooled with ice water and was mixed with a cold saturated ammonium chloride solution. The organic layer was separated, the aqueous layer was extracted twice with 100 cc. portions of ether, and the combined ethereal layers were dried over sodium sulfate and evaporated. The residue, upon recrystallization from ethyl acetate-petroleum ether, yielded colorless crystals of 2-chloro-9-(ω-dimethylaminopropyl)-xanthen-9-ol; M.P. 129°–130°.

20 g. of 2-chloro-9-(ω-dimethylaminopropyl)-xanthen-9-ol were dissolved in 200 cc. of absolute ethanol, and the resulting solution was mixed with 20 cc. of ethanolic hydrogen chloride solution (30% HCl by weight). The reaction mixture was allowed to stand for two hours at room temperature, then the alcohol was removed under diminished pressure at 30°–40°, and the residue was recrystallized from ethanol-ether. The 2-chloro-9-(ω-dimethylaminopropylidene)-xanthene hydrochloride thus obtained formed colorless, water-soluble crystals; M.P. 196°–197°. The free base is an oil.

Example 3

In a 2-liter, round-bottom flask fitted with stirrer, dropping funnel and condenser, 5 g. of activated finely divided Gilman copper-magnesium alloy were covered with 20 cc. of dry ether and 1.0 cc. of methyl iodide was added. As soon as the vigorous reaction subsided somewhat, 15 g. of magnesium shavings were added in a single portion, and a solution of 70 g. of freshly distilled ω-(N-piperidino)-propyl chloride in 360 cc. of dry ether was dropped in during a period of one hour. The reaction mixture was then boiled for six hours at 40° under a reflux condenser and then was stirred overnight at room temperature. On the following day a suspension of 40 g. of finely pulverized xanthone in 800 cc. of dry ether was added portionwise, while stirring. The whole mixture was stirred for an additional 20 hours at 20°. Then, the reaction mixture was cooled with ice water and mixed with a cold saturated ammonium chloride solution. The organic layer was separated, the aqueous layer was extracted twice with 200 cc. portions of ether, and the combined ethereal layers were dried over sodium sulfate and evaporated. The residue, upon recrystallization from ethyl acetate, yielded colorless crystals of 9-[ω-(N-piperidino)-propyl]-xanthen-9-ol; M.P. 144°–145°.

25 g. of 9-[ω-(N-piperidino)-propyl]-xanthen-9-ol, were dissolved in 250 cc. of absolute ethanol. The solution obtained was mixed with 25 cc. of ethanolic hydrogen chloride solution (30% HCl by weight). The reaction mixture was allowed to stand for three hours at room temperature, then the alcohol was removed under diminished pressure at 30°–40°, and the residue was recrystallized from ethanol-ether. The 9-[ω-(N-piperidino)-propylidene]-xanthene hydrochloride thus obtained formed colorless, water soluble crystals; M.P. 210°–211° (with decomposition). The free base is an oil.

Example 4

2.0 g. of activated finely divided Gilman copper-magnesium alloy and 1.6 g. of unactivated copper-magnesium alloy were placed in a 250 cc., 3-neck flask, which was equipped with stirrer, condenser and dropping funnel, and were covered with 20 cc. of absolute ether and a trace of iodine. Then, 10–12 drops of ethyl bromide were added. After vigorous reaction had developed, a solution of 16 g. of ω-dimethylaminopropyl chloride in 30 cc. of absolute ether was slowly dropped in during which time the stirrer was operated only occasionally. As soon as the reaction subsided, the reaction vessel was dipped into a heating bath having a temperature of 50°, the stirrer was started and stirring was continued for four hours in order to complete the reaction. Then, 6.0 g. of thioxanthone in solid form were added portionwise and the reaction mixture was stirred at 50° until the yellow color of the thioxanthone disappeared and the reaction mixture took on a grayish-white color. The mixture was cooled down to room temperature and was poured into a well cooled solution of 20 g. of ammonium chloride in 300 cc. of water. 200 cc. of ethyl acetate were added and the mixture was stirred well. The mixture was freed by filtration of a little undissolved sludge, the organic layer was separated in a separatory funnel, dried with sodium sulfate and freed of solvent in vacuo. The residue was recrystallized from high boiling petroleum ether. Thus, 7.2 g. of compact yellowish-white crystals of 9-(ω-dimethylaminopropyl)-thioxanthen-9-ol, were obtained; M.P. 147°–148°.

7.2 g. of 9-(ω-dimethylaminopropyl)-thioxanthen-9-ol, were covered with 40 cc. of phosphorus oxychloride. The reaction mixture was refluxed for one hour at 110°, cooled, and dropped into ice. Upon completion of the hydrolysis, the reaction mixture was made strongly alkaline with sodium hydroxide solution, and was then extracted well with ethyl acetate. The organic extract was dried over sodium sulfate, freed of solvent in vacuo, and the residue was distilled in high vacuum. Thus, 6.9 g. of 9-(ω-dimethylaminopropylidene)-thioxanthene were obtained as a yellowish oil; B.P. 153°–154°/0.05 mm.

*Example 5*

1.0 g. of activated finely divided Gilman copper-magnesium alloy and 1.0 g. of unactivated copper-magnesium alloy were placed in a 5 cc., 3-neck flask, which was equipped with stirrer, condenser and dropping funnel, and were covered with 10 cc. of absolute ether and a trace of iodine. Then, 5 drops of ethyl bromide were added. After vigorous reaction had developed, a solution of 9 g. of ω-dimethylaminopropyl chloride in 20 cc. of absolute ether, was slowly dropped in during which time the stirrer was operated only occasionally. As soon as the reaction slowed down somewhat, the reaction vessel was dipped into a heating bath having a temperature of 50°, the stirrer was started and stirring was continued for four hours in order to complete the reaction. Then, 4.0 g. of 2-chlorothioxanthone in solid form were added portionwise and the reaction mixture was stirred at 50° until the yellow color of the 2-chloro-thioxanthone disappeared and the reaction mixture took on a grayish-white color. Then the mixture was cooled down to room temperature, poured into a well cooled solution of 15 g. of ammonium chloride in 200 cc. of water, 150 cc. of ethyl acetate were added and the mixture was stirred well. The mixture was freed by filtration of a little undissolved sludge. The organic layer was separated in a separatory funnel and was dried with sodium sulfate and freed of solvent in vacuo. The residue was recrystallized from high boiling petroleum ether. Thus, 4 g. of prismatic needles of 2-chloro-9-(ω-dimethylaminopropyl)-thioxanthen-9-ol were obtained; M.P. 148°–150°.

Upon shaking and cooling, 117 g. of 2-chloro-9-(α-dimethylaminopropyl)-thioxanthen-9-ol were introduced into 700 cc. of phosphorus oxychloride. The red solution thus obtained was boiled for 2 hours under reflux at a bath temperature of 130°, then the solvent was removed under diminished pressure. The residue was cooled and shaken overnight with 3500 cc. of water, a light brown clear solution being thus produced. The solution was made alkaline to phenolphthalein with about 400 cc. of 30% sodium hydroxide solution, filtered and extracted well with petroleum ether (boiling interval of 80–105°) at 60°. The petroleum ether extract was washed with water and dried over sodium sulfate. Then, the solvent was carefully removed on the water bath under water pump vacuum. The remaining oil was purified by distillation at low pressure. Thus, 103 g. of a mixture of stereoisomers of 2-chloro-9-(ω-dimethylaminopropylidene)-thioxanthene was obtained as a light yellow oil (B.P. 160–162°/0.05 mm.), which was almost colorless after redistillation.

100 g. of a mixture of stereoisomers of 2-chloro-9-(ω-dimethylaminopropylidene)-thioxanthene were dissolved at 35° in 300 cc. of low boiling petroleum ether and the solution was allowed to stand in the ice-box for 48 hours. The higher melting isomer that precipitated was separated from the mother-liquor by filtration. The rough crystals thus obtained were recrystallized from high boiling petroleum ether (boiling interval 80–105°). Thus 28—30 g. of light yellow crystals of melting point 95° were obtained. With acids and quaternizing agents this substance formed well crystallized salts which were easily soluble in alcohol, but difficultly soluble in water. The solubility of the hydrochloride (M.P. 193–194°) and of the neutral sulfate (M.P. 139–140°) of the high melting stereoisomer was less than 1%.

After separation of the higher melting isomer of melting point 95°, the remaining petroleum ether solution was cautiously evaporated in vacuo. The lower melting isomer was isolated direct by recrystallization of the residue from aqueous methanol (90%). A preferred mode of execution consisted in first allowing the evaporation residue to crystallize in the ice-box in absence of solvent. The separated crystals were sucked off and washed with little ice-cooled low boiling petroleum ether. Then the crystals were dissolved in methanol, the solution was cautiously mixed with water until constant turbidity and the latter was straight away removed by dropwise addition of methanol. The mixture was allowed to stand in the ice-box for at least 12 hours, the yellow crystals that separated were sucked off, washed with a little portion of cold aqueous methanol (90%) and finally dried over phosphorus pentoxide in a vacuum desiccator. The low melting stereoisomer of 2-chloro-9-(ω-dimethylaminopropylidene)-thioxanthene melted at 43° and was easily soluble in the usual organic solvents.

The 2-chloro-thioxanthone used as starting material was obtained as follows:

A diazo solution of anthranilic acid (prepared from 300 g. of anthranilic acid) was added dropwise to a stirred suspension containing 225 g. of sodium hydroxide, 1000 cc. of water, 500 g. of ice, 300 g. of p-chloro-thiophenol and 15 g. of copper. The mixture was stirred overnight, then the precipitate was sucked off and redissolved in much warm water. By filtration the solution was freed of the insoluble copper. The light yellow filtrate was treated with hydrochloric acid. Thereby, the 4'-chloro-2-carboxy-diphenylsulfide precipitated; M.P. 232–233°.

347 g. of this acid were stirred for 2 hours at 110° with 3470 cc. of concentrated sulfuric acid. The reaction mixture was then poured into 14 liters of water. The light yellow crystals of 2-chloro-thioxanthone which formed thereby were sucked off; M.P. 149°.

*Example 6*

4.66 g. of activated finely divided Gilman copper-magnesium alloy and 1.0 g. of unactivated copper-magnesium alloy were reacted with ω-dimethylaminopropyl chloride and 4-chloro-thioxanthone according to the procedure described in Example 5. The 4-chloro-9-(ω-dimethylaminopropyl)-thioxanthen-9-ol thus obtained melted at 129°, after recrystallization from benzene-high boiling petroleum ether.

12 g. of 4-chloro-9-(ω-dimethylaminopropyl)thioxanthen-9-ol were boiled for 4 hours under reflux with 100 cc. of formic acid. An excess of formic acid was evaporated in vacuo, the remaining oil was digested at 50° with 1 N sodium hydroxide solution and, after cooling, the alkaline solution was extracted with methylene chloride. The methylene chloride extract was dried over sodium sulfate, the solvent was evaporated and the remaining oil was distilled in high vacuo. Thus, 10 g. of 4-chloro-9-(ω-dimethylaminopropylidene)-thioxanthene were obtained, B.P. 180°/0.02 mm.

The 4-chloro-thioxanthone used as starting material was produced according to Example 5 by condensation of diazotized anthranilic acid with o-chlorothiophenol and subsequent cyclisation by means of concentrated sulfuric acid; M.P. 178–179°.

*Example 7*

4.66 g. of activated finely divided Gilman copper-magnesium alloy and 3.75 g. of unactivated copper-magnesium alloy were reacted with ω-dimethylaminopropyl chloride and 3-chlorothioxanthone according to the procedure described in Example 5. The 3-chloro-9-(ω-dimethylaminopropyl)-thioxanthen-9-ol was thus obtained; M.P. 104°.

This product was treated with phosphorus oxychloride in the same manner as in Example 5. By splitting out water, there was obtained 3-chloro-9-(ω-dimethylaminopropylidene)-thioxanthene; B.P. 150°/0.01 mm.

The 3-chloro-thioxanthone used as starting material was produced according to Example 5 by condensation of diazotized 4-chloro anthranilic acid with thiophenol and subsequent cyclisation by means of concentrated sulfuric acid. M.P. 168°–169°.

*Example 8*

4.66 g. of activated finely divided Gilman copper-magnesium alloy and 3.75 g. of unactivated copper-magnesium alloy were reacted with 37.5 g. of ω-dimethylaminopropyl chloride and 15 g. of 2-bromo-thioxanthone according to the procedure described in Example 5. The 2-bromo-9-(ω-dimethylaminopropyl)-thioxanthen-9-ol was thus obtained; M.P. 139–140°.

This product was treated with phosphorus oxychloride in the same manner as in Example 5. By splitting out water, there was obtained 2-bromo-9-(ω-dimethylaminopropylidene)-thioxanthene; B.P. 180°/0.05 mm.

The 2-bromo-thioxanthone used as starting material was prepared according to Example 5 by condensation of diazotized anthranilic acid was p-bromo-thiophenol and subsequent cyclisation by means of concentrated sulfuric acid. M.P. 154°.

*Example 9*

4.66 g. of activated finely divided Gilman copper magnesium alloy and 3.75 g. of unactivated copper-magnesium alloy were reacted with 37.5 g. of ω-dimethylaminopropyl chloride and 17 g. of 2-fluoro-thioxanthone according to the procedure described in Example 5. The 2-fluoro-9-(ω-dimethylaminopropyl)-thioxanthen-9-ol was thus obtained; M.P. 171–172°.

This product was treated with phosphorus oxychloride in the same manner as described in Example 5. By splitting out water, there was obtained 2-fluoro-9-(ω-dimethylaminopropylidene)-thioxanthene; B.P. 162°/0.05 mm.

The 2-fluoro-thioxanthone used as starting material was prepared according to Example 5 by condensation of diazotized anthranilic acid with p-fluoro-thiophenol and subsequent cyclisation by means of concentrated sulfuric acid; M.P. 171°.

*Example 10*

4.66 g. of activated finely divided Gilman copper-magnesium alloy and 3.75 g. of unactivated copper-magnesium alloy were reacted with 37.5 g. of ω-dimethylaminopropyl chloride and 20 g. of 2-methyl-thioxanthone according to the procedure described in Example 5. The 2-methyl-9-(ω-dimethylaminopropyl)-thioxanthen-9-ol was thus obtained; M.P. 118–119°.

This product was treated with phosphorus oxychloride in the same manner as in Example 5. By splitting out water, there was obtained 2-methyl-9-(ω-dimethylaminopropylidene)-thioxanthene; B.P. 163°/0.02 mm.

*Example 11*

4.66 g. of activated finely divided Gilman copper-magnesium alloy and 3.75 g. of unactivated copper-magnesium alloy were reacted with 37.5 g. of ω-dimethylaminopropyl chloride and 14 g. of 2-methoxy-thioxanthone according to the procedure described in Example 5. The 2-methoxy-9-(ω-dimethylaminopropyl)-thioxanthen-9-ol was thus obtained; M.P. 117–118°.

This product was treated with phosphorus oxychloride in the same manner as in Example 5. By splitting out water, there was obtained 2-methoxy-9-(ω-dimethylaminopropylidene)-thioxanthene; B.P. 180–183°/0.02 mm.

*Example 12*

4.66 g. of activated finely divided Gilman copper-magnesium alloy and 3.75 g. of unactivated copper-magnesium alloy were reacted with 37.5 g. of ω-dimethylaminopropyl chloride and 20 g. of 4-methoxy-thioxanthone according to the procedure described in Example 5. The 4-methoxy-9-(ω-dimethylaminopropyl)-thioxanthen-9-ol was thus obtained; M.P. 119–121°.

This product was treated with phosphorus oxychloride in the same manner as in Example 5. By splitting out water, there was obtained 4-methoxy-9-(ω-dimethylaminopropylidene)-thioxanthene; B.P. 194–196°/0.06 mm.

The 4-methoxy-thioxanthone used as starting material was produced as follows:

A mixture containing 14.7 g. of thiosalicyclic acid, 22.5 g. of o-iodo-anisol, 13.5 g. of finely pulverised potassium carbonate, 51 cc. of isoamyl alcohol and a trace of copper acetate was boiled for 16 hours under reflux. The reaction mixture was treated with 3 N sodium hydroxide and the amyl alcohol was removed by steam distillation. The remaining solution was filtered and treated with 3 N hydrochloric acid; thereby, the 6-methoxy-2'-carboxy-diphenyl sulfide precipitated; M.P. 189–191°.

10 g. of this acid were boiled for 1 hour under reflux with thionyl chloride. The excess of thionyl chloride was removed in vacuo. 10.6 g. of the acid chloride thus obtained was dissolved in 50 cc. of absolute benzene. After addition of 5 g. of aluminium chloride at room temperature the reaction mixture was stirred overnight and then extracted well with ethyl acetate. The organic extract was washed with 3 N sodium hydroxide solution and with water. Then, it was dried over sodium sulfate, freed of solvent in vacuo, and the residue was recrystallized from acetic acid. Thus, yellow needles of 4-methoxy-thioxanthone were obtained; M.P. 163–164°.

*Example 13*

4.66 g. of activated finely divided Gilman copper-magnesium alloy and 3.75 g. of unactivated copper-magnesium alloy were reacted with 37.5 g. of ω-dimethylaminopropyl chloride and 18 g. of 3-methoxy-thioxanthone according to the procedure described in Example 5. The 3-methoxy-9-(ω-dimethylaminopropyl)-thioxanthen-9-ol was thus obtained; M.P. 108–110°.

This product was treated with phosphorus oxychloride in the same manner as in Example 5. By splitting out water, there was obtained 3-methoxy-9-(ω-dimethylaminopropylidene)-thioxanthene; B.P. 176–178°/0.02 mm.

The 3-methoxy-thioxanthene used as starting material was prepared as follows:

A diazo solution of 4-methoxy-anthranilic acid was added dropwise to a solution of 12 g. of thiophenol and 30 g. of sodium hydroxide in 50 cc. of water, which was warmed up to 70°. Then, the reaction temperature was held for one more hour at 70°. The reaction mixture was filtered and the filtrate was treated with hydrochloric acid. The precipitate thereby formed was sucked off and washed with water. The brown-red crystals were then dissolved in sodium carbonate solution, the latter was boiled for 1½ hours under reflux. After cooling, the solution was filtered and treated again with hydrochloric acid. The precipitate was filtered off and dried. 26 g. of the 5-methoxy-2-carboxy-diphenyl sulfide thus obtained were mixed with 30 cc. of obsolute benzene. Then, 50 cc. of thionyl chloride were added dropwise. The reaction mixture was boiled for ½ hour under reflux and the solvent was removed in vacuo. The acid chloride thus obtained was dissolved in 100 cc. of absolute benzene. After addition of 11 g. of aluminium trichloride at room temperature, the mixture was stirred overnight and poured into dilute hydrochloric acid. The aqueous phase was extracted well with ethyl acetate. The combined extracts were washed with 3 N hydrochloric acid, 3 N sodium hydroxide and water. Then, it was dried over sodium sulfate and freed of solvent. The residue was sublimated in high vacuo. The 3-methoxy-thioxanthone was thus obtained; M.P. 118–120°.

*Example 14*

4.66 g. of activated finely divided Gilman copper-magnesium alloy and 3.75 g. of unactivated copper-magnesium alloy were reacted with 37.5 g. of ω-dimethylaminopropyl chloride and 19 g. of 1-methoxy-thioxanthone according to the procedure described in Example 5. The 1-methoxy-9-(ω-dimethylaminopropyl) - thioxanthen-9-ol was thus obtained; M.P. 126–128°.

This product was treated with phosphorus oxychloride in the same manner as in Example 5. By splitting out water, there was obtained 1-methoxy-9-(ω-dimethylaminoproplidene)-thioxanthone; B.P. 166–168°/0.004 mm.

The 1-methoxy-thioxanthone used as starting material was prepared according to Example 13 by condensation of diazotized 6-methoxy-anthranilic acid with thiophenol and subsequent cyclization. M.P. 125–126°.

*Example 15*

4.66 g. of activated finely divided Gilman copper-magnesium alloy and 3.75 g. of unactivated copper-magnesium alloy were reacted with 37.5 g. of ω-dimethylaminopropyl chloride and an absolute benzenic solution of 1-chloro-4-methoxy-thioxanthone according to the procedure described in Example 5. The 1-chloro-4-methoxy-9-(ω-dimethylaminopropyl)-thioxanthen-9-ol was thus obtained; M.P. 96–98°.

This product was treated with phosphorus oxychloride in the same manner as in Example 5. By splitting out water, there was obtained 1-chloro-4-methoxy-9-(ω-dimethylaminopropylidene)-thioxanthene; B.P. 206–208°/0.09 mm.

*Example 16*

4.66 g. of activated finely divided Gilman copper-magnesium alloy and 3.75 g. of unactivated copper-magnesium alloy were reacted with 37.5 g. of ω-dimethylaminopropyl chloride and an absolute benzenic solution of 20 g. of 1-methyl-4-methoxythioxanthone according to the procedure described in Example 5. The 1-methyl-4-methoxy-9-(ω-dimethylaminopropyl) - thioxanthen-9-ol was thus obtained; M.P. 133–134°.

This product was treated with phosphorus oxychloride in the same manner as in Example 5. By splitting out water, there was obtained 1-methyl-4-methoxy-9-(ω-dimethylaminopropylidene)-thioxanthene; B.P. 177–180°/0.03 mm.

*Example 17*

4.66 g. of activated finely divided Gilman copper-magnesium alloy and 3.75 g. of unactivated copper-magnesium alloy were reacted with 37.5 g. of ω-dimethylaminopropyl chloride and 19 g. of 1-methyl-4-chloro-thioxanthone according to the procedure described in Example 5. The 1-methyl-4-chloro-9-(ω-dimethylaminopropyl)-thioxanthen-9-ol was first obtained; M.P. 150°.

This product was treated with phosphorus oxychloride in the same manner as in Example 5. By splitting out water, there was obtained 1-methyl-4-chloro-9-(ω-dimethylaminopropylidene)-thioxanthene; B.P. 174°/0.009 mm.

*Example 18*

4.66 g. of activated finely divided Gilman copper-magnesium alloy and 3.75 g. of unactivated copper-magnesium alloy were reacted with 37.5 g. of ω-dimethylaminopropyl chloride and 19 g. of 1-chloro-4-methyl-thioxanthone according to the procedure described in Example 5. The 1 - chloro-4-methyl-9-(ω-dimethylaminopropyl)-thioxanthen-9-ol was first obtained; M.P. 137°.

This product was treated with phosphorus oxychloride in the same manner as in Example 5. By splitting out water, there was obtained 1-chloro-4-methyl-9-(ω-dimethylaminopropylidene)-thioxanthene; B.P. 172°/0.05 mm.

*Example 19*

4.66 g. of activated finely divided Gilman copper-magnesium alloy and 3.75 g. of unactivated copper-magnesium alloy were reacted with 37.5 g. of ω-dimethylaminopropyl chloride and an absolute benzenic solution of 18 g. of 2-chloro-7-methoxy-thioxanthone according to the procedure described in Example 5. The 2-chloro-7-methoxy-9-(ω-dimethylaminopropyl) - thioxanthen - 9 - ol was thus obtained, M.P. 162–164°.

This product was treated with phosphorus oxychloride in the same manner as in Example 5. By splitting out water, there was obtained 2-chloro-7-methoxy-9-(ω-dimethylaminopropylidene)-thioxanthene; B.P. 198°/0.05 mm.

The 2-chloro-7-methoxy-thioxanthone used as starting material was prepared as follows:

A mixture containing 4.5 g. of 5-chloro-thiosalicyclic acid, 5.6 g. of p-iodo-anisol, 3.33 g. of finely pulverised potassium carbonate and a trace of copper acetate was heated for 16 hours under reflux. The reaction mixture was treated with 3 N sodium hydroxide and the amyl alcohol was removed by steam distillation. The remaining hot solution was filtered and, after cooling, treated with 3 N hydrochloric acid. Then, the solution was extracted well with chloroform. The organic extract was dried over sodium sulfate, and the solvent was removed in vacuo. 3.3 g. of 4-methoxy-4'-chloro-2'-carboxy-diphenyl sulfide was thus obtained, M.P. 170–172°.

20 g. of this acid were boiled for ½ hour under reflux with 100 cc. of thionyl chloride. The excess of thionyl chloride was removed in vacuo. The acid chloride thus obtained (20.1 g.) was dissolved in 200 cc. of absolute benzene. After addition of 5 g. of aluminium trichloride at room temperature, the reaction mixture was stirred overnight and poured into 3 N hydrochloric acid. The aqueous phase was well extracted with ethyl acetate. The combined extracts were dried over sodium sulfate and freed of the solvent. The residue was mixed with 3 N sodium hydroxide, filtered and washed with water. After sublimation in high vacuo yellow needles of 2-chloro-7-thioxanthone were obtained; M.P. 164–166°.

*Example 20*

4.66 g. of activated finely divided Gilman copper-magnesium alloy and 3.75 g. of unactivated copper-magnesium alloy were reacted with 37.5 g. of ω-dimethylaminopropyl chloride and 20 g. of 2,7-dibromo-thioxanthone according to the procedure described in Example 5. The 2,7-dibromo-9-(ω-dimethylaminopropyl)-thioxanthen-9-ol was thus obtained; M.P. 209–210°.

10 g. of this product were heated for 4 hours under reflux with 80 cc. of acetic anhydride. The acetic anhydride was distilled off in vacuo, the residue was digested with 1 N sodium hydroxide solution and the alcaline suspension was extracted with methylene chloride. The methylene chloride extracts were dried over sodium sulfate and the solvent evaporated. After recrystallization from petroleum ether, there was obtained 8 g. of 2,7-dibromo-9 - (ω - dimethylaminopropylidene) - thioxanthene; M.P. 109–110°.

A mixture of 21.2 g. of thioxanthone, 100 cc. of acetic acid, 12 cc. of bromine and a trace of iodine was boiled under a reflux condenser. After the development of hydrogen bromide had subsided the reaction mixture was cooled and treated with 200 cc. of water. The precipitate which formed was separated, washed with dilute thiosulfate solution, dried and recrystallized from benzene, 2,7-dibromo-thioxanthone was thus obtained, M.P. 263–264°.

We claim:

1. A compound selected from the group consisting of compounds of the formula

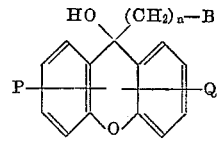

wherein B is a tertiary amino radical containing up to five carbon atoms selected from the group consisting of di-lower alkyl-amino, piperidino, morpholino and thiamorpholino; P and Q are each selected from the group consisting of hydrogen, halogen, lower alkyl and lower alkoxy; and $n$ is an integer from 3 to 7 inclusive
pharmaceutically acceptable acid addition salts thereof, and pharmaceutically acceptable quaternary ammonium salts thereof wherein the quaternizing radical is lower alkyl.

2. 2-halo-9-(ω-dimethylaminopropyl)-xanthen-9-ol.
3. 2-lower alkyl-9-(ω-dimethylaminopropyl)-xanthen-9-ol.
4. 2-lower alkoxy-9-(ω-dimethylaminopropyl)-xanthen-9-ol.
5. A compound selected from the group consisting of compounds of the formula

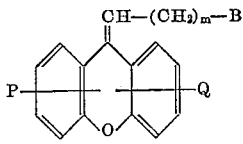

wherein B is a tertiary amino radical containing up to five carbon atoms selected from the group consisting of di-lower alkyl-amino, piperidino, morpholino and thiamorpholino; P and Q are each selected from the group consisting of hydrogen, halogen, lower alkyl and lower alkoxy; and $m$ is an integer from 2 to 6 inclusive
pharmaceutically acceptacle acid addition salts thereof, and pharmaceutically acceptable quaternary ammonium salts thereof wherein the quaternizing radical is lower alkyl.

6. 2-halo-9-(ω-dimethylaminopropylidene)-xanthene.
7. 2-lower alkyl-9-(ω-dimethylaminopropylidene)-xanthene.
8. 2-lower alkoxy-9-(ω-dimethylaminopropylidene)-xanthene.
9. A process of preparing a compound of the formula

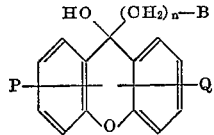

wherein B is a tertiary amino radical containing up to five carbon atoms selected from the group consisting of di-lower alkyl-amino, piperidino, morpholino and thiamorpholino; P and Q are each selected from the group consisting of hydrogen, halogen, lower alkyl and lower alkoxy; and $n$ is an integer from 3 to 7
which comprises reacting a corresponding nuclearly substituted xanthone with a compound of the formula $$X—(CH_2)_n—B$$

wherein X represents halogen, and B and $n$ have the same meaning as above
in the presence of a metal selected from the group consisting of magnesium, lithium, and zinc.

10. A process of preparing a compound of the formula

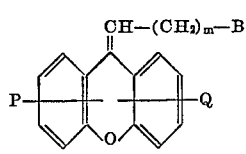

wherein B is a tertiary amino radical containing up to five carbon atoms selected from the group consisting of di-lower alkyl-amino, piperidino, morpholino and thiamorpholino; P and Q are each selected from the group consisting of hydrogen, halogen, lower alkyl and lower alkoxy; and $m$ represents an integer from 2 to 6
which comprises dehydrating a compound of the formula

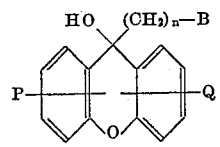

wherein B, P and Q have the same meaning as above and $n$ is an integer from 3 to 7 inclusive.

11. A process which comprises condensing a compound of the formula

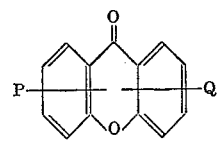

wherein P and Q are each selected from the group consisting of hydrogen, halogen, lower alkyl and lower alkoxy
with a compound of the formula $$X—(CH_2)_n—B$$

wherein X is halogen; B is a tertiary amino radical containing up to five carbon atoms selected from the group consisting of di-lower alkyl-amino, piperidino, morpholino and thiamorpholino, (and $n$ is an integer from 3 to 7
in the presence of a metal selected from the group consisting of magnesium, lithium, and zinc and hydrolyzing the metallo condensation product obtained, thereby producing an intermediate compound of the formula

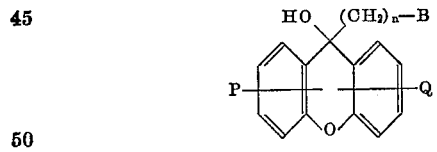

wherein B, P, Q and $n$ have the same meaning as above and dehydrating said intermediate compound thereby producing a compound of the formula

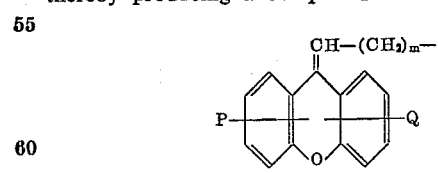

wherein B, P and Q have the same meaning as above and $m$ is a number equal to $n$ minus one.

References Cited in the file of this patent
UNITED STATES PATENTS
2,951,082    Sprague et al. _____ Aug. 30, 1960